United States Patent
Mercier et al.

(10) Patent No.: US 9,490,639 B2
(45) Date of Patent: Nov. 8, 2016

(54) CHARGE EQUALIZATION SYSTEM FOR BATTERIES

(75) Inventors: Sylvain Mercier, Saint Egreve (FR); Daniel Chatroux, Teche (FR); Julien Dauchy, Chatte (FR); Eric Fernandez, Saint Paul de Varces (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 893 days.

(21) Appl. No.: 13/577,188

(22) PCT Filed: Feb. 4, 2011

(86) PCT No.: PCT/EP2011/051691
§ 371 (c)(1),
(2), (4) Date: Feb. 19, 2016

(87) PCT Pub. No.: WO2011/095610
PCT Pub. Date: Aug. 11, 2011

(65) Prior Publication Data
US 2013/0043842 A1    Feb. 21, 2013

(30) Foreign Application Priority Data

Feb. 5, 2010   (FR) ..................... 10 00478
Jul. 21, 2010  (FR) ..................... 10 03071
Jul. 22, 2010  (FR) ..................... 10 03087

(51) Int. Cl.
*H02J 7/00*     (2006.01)
*B60L 11/18*    (2006.01)
(Continued)

(52) U.S. Cl.
CPC ............ *H02J 7/0016* (2013.01); *B60L 3/0046* (2013.01); *B60L 11/1861* (2013.01); *B60L 11/1866* (2013.01); *H01M 10/46* (2013.01);
(Continued)

(58) Field of Classification Search
CPC ...................................................... B60L 3/0046
USPC ......................................... 320/119; 307/148
See application file for complete search history.

(56) References Cited

U.S. PATENT DOCUMENTS 1,724,607 A *  8/1929  Lincoln ................. 320/119
3,775,659 A    11/1973 Carlsen
(Continued)

FOREIGN PATENT DOCUMENTS

CN     1905259        1/2007
CN     101606299 A   12/2009
(Continued)

*Primary Examiner* — Robert Grant
*Assistant Examiner* — John Trischler
(74) *Attorney, Agent, or Firm* — Occhiuti & Rohlicek LLP (57) ABSTRACT

A battery equalization system has two accumulator stages in series, each including an accumulator, and ±poles, a voltage generator for each accumulator stage, and an associated charging device powered by the generator. The charging device includes an inductor and capacitors. One capacitor connects to the generator's positive pole, the other connects to its negative pole, a first diode, whose anode connects to a negative pole of the accumulator stage and whose cathode connects to the first capacitor, a second diode whose anode connects to the negative pole of the accumulator stage and whose cathode connects to the second end of the second capacitor, and a switch connected to the inductor and to the positive pole of the accumulator stage, and a control device that controls the generator, closes the switch and causes the inductor to stores energy and to transfer it to the associated accumulator stage.

17 Claims, 10 Drawing Sheets

(51) Int. Cl.
*B60L 3/00* (2006.01)
*H01M 10/46* (2006.01)
*H01M 10/42* (2006.01)

(52) U.S. Cl.
CPC .......... *H02J 7/0014* (2013.01); *H02J 7/0019* (2013.01); *H01M 2010/4271* (2013.01); *H02J 7/0065* (2013.01); *Y02T 10/7005* (2013.01); *Y02T 10/7044* (2013.01); *Y02T 10/7061* (2013.01)

(56) References Cited

U.S. PATENT DOCUMENTS

| | | | |
|---|---|---|---|
| 3,921,050 A * | 11/1975 | Rowas | 320/119 |
| 4,706,009 A | 11/1987 | Schwarz | |
| 4,723,105 A * | 2/1988 | Matouka et al. | 320/123 |
| 5,003,244 A | 3/1991 | Davis, Jr. | |
| 5,267,138 A * | 11/1993 | Shores | 363/98 |
| 5,479,083 A | 12/1995 | Brainard | 320/121 |
| 5,592,067 A * | 1/1997 | Peter et al. | 320/103 |
| 5,631,534 A * | 5/1997 | Lewis | 320/103 |
| 5,659,237 A | 8/1997 | Divan et al. | |
| 5,710,504 A | 1/1998 | Pascual et al. | |
| 5,726,551 A * | 3/1998 | Miyazaki et al. | 320/124 |
| 5,982,143 A * | 11/1999 | Stuart | 320/119 |
| 6,076,018 A * | 6/2000 | Sturman et al. | 607/72 |
| 6,140,800 A * | 10/2000 | Peterson | 320/118 |
| 6,150,795 A * | 11/2000 | Kutkut et al. | 320/118 |
| 6,202,776 B1 | 3/2001 | Masberg et al. | |
| 6,259,229 B1 * | 7/2001 | Ashtiani | H05B 1/0236 320/128 |
| 6,362,597 B2 | 3/2002 | Leppo et al. | |
| 6,583,602 B2 * | 6/2003 | Imai | H02J 7/0018 320/118 |
| 6,597,156 B2 | 7/2003 | Gogolla | |
| 6,781,335 B2 | 8/2004 | Osinga et al. | |
| 6,798,166 B2 | 9/2004 | Godefroy | |
| 6,841,971 B1 * | 1/2005 | Spee et al. | 320/119 |
| 6,879,140 B2 | 4/2005 | Elkin et al. | |
| 7,127,288 B2 * | 10/2006 | Sturman et al. | 607/2 |
| 7,245,108 B2 * | 7/2007 | Chertok et al. | 320/132 |
| 7,400,114 B2 * | 7/2008 | Anzawa et al. | 320/119 |
| 7,425,816 B2 * | 9/2008 | Meyer et al. | 320/141 |
| 7,612,530 B2 * | 11/2009 | Konishi et al. | 320/120 |
| 7,714,544 B2 | 5/2010 | Bolz et al. | |
| 7,750,505 B2 | 7/2010 | Ichikawa | |
| 7,880,433 B2 * | 2/2011 | Oh et al. | 320/118 |
| 8,004,238 B2 * | 8/2011 | Kim et al. | 320/118 |
| 8,049,349 B2 | 11/2011 | Saito et al. | |
| 8,129,945 B2 * | 3/2012 | Hartzog | 320/118 |
| 8,148,942 B2 * | 4/2012 | Densham et al. | 320/116 |
| 8,228,032 B2 * | 7/2012 | Bai et al. | 320/118 |
| 8,253,378 B2 | 8/2012 | Lee et al. | |
| 8,405,349 B2 * | 3/2013 | Kikinis et al. | 320/116 |
| 8,436,582 B2 * | 5/2013 | Pigott | 320/118 |
| 8,594,873 B2 | 11/2013 | Kimura et al. | |
| 8,659,182 B2 | 2/2014 | Ichikawa et al. | |
| 8,692,515 B2 * | 4/2014 | Nakao et al. | 320/116 |
| 2002/0084770 A1 * | 7/2002 | Jabaji | 320/118 |
| 2002/0109482 A1 | 8/2002 | Anzawa et al. | |
| 2004/0032236 A1 | 2/2004 | Canter | |
| 2004/0037100 A1 * | 2/2004 | Orr | H02M 3/33576 363/131 |
| 2004/0251880 A1 * | 12/2004 | O'Brien | 320/166 |
| 2005/0024015 A1 | 2/2005 | Houldsworth et al. | |
| 2005/0077879 A1 | 4/2005 | Near | |
| 2005/0140335 A1 | 6/2005 | Lee et al. | |
| 2005/0162130 A1 * | 7/2005 | Petitdidier | 320/116 |
| 2006/0001406 A1 | 1/2006 | Matan | |
| 2007/0145946 A1 * | 6/2007 | Chiang et al. | 320/118 |
| 2008/0084184 A1 * | 4/2008 | Ohnuki | 320/116 |
| 2008/0106239 A1 | 5/2008 | Cegnar et al. | |
| 2008/0116850 A1 * | 5/2008 | Konishi et al. | 320/118 |
| 2008/0231231 A1 * | 9/2008 | Hartzog | 320/118 |
| 2008/0238527 A1 | 10/2008 | Bolz et al. | |
| 2009/0046491 A1 * | 2/2009 | Zacharias et al. | 363/134 |
| 2009/0067200 A1 | 3/2009 | Bolz et al. | |
| 2009/0096419 A1 * | 4/2009 | White | B60L 11/1861 320/118 |
| 2009/0096422 A1 | 4/2009 | Trattler | |
| 2009/0167247 A1 * | 7/2009 | Bai et al. | 320/134 |
| 2009/0184581 A1 | 7/2009 | Kohnotoh et al. | |
| 2009/0195079 A1 | 8/2009 | Barrenscheen | |
| 2009/0273321 A1 * | 11/2009 | Gotzenberger et al. | 320/166 |
| 2009/0278496 A1 | 11/2009 | Nakao et al. | |
| 2009/0309544 A1 * | 12/2009 | Studyvin et al. | 320/116 |
| 2010/0001866 A1 | 1/2010 | Ichikawa et al. | |
| 2010/0007308 A1 * | 1/2010 | Lee et al. | 320/118 |
| 2010/0231167 A1 * | 9/2010 | Ohnuki | 320/119 |
| 2010/0283433 A1 * | 11/2010 | Oh et al. | 320/162 |
| 2012/0007558 A1 * | 1/2012 | Pigott | 320/118 |
| 2012/0286733 A1 | 11/2012 | Chang et al. | |
| 2012/0292988 A1 | 11/2012 | Nishida et al. | |
| 2013/0020982 A1 * | 1/2013 | Mercier et al. | 320/103 |
| 2013/0038290 A1 * | 2/2013 | Chatroux et al. | 320/119 |
| 2013/0043842 A1 * | 2/2013 | Mercier et al. | 320/119 |
| 2013/0076310 A1 | 3/2013 | Garnier et al. | |
| 2013/0122341 A1 | 5/2013 | De Paoli et al. | |
| 2013/0328392 A1 | 12/2013 | Desbois | |
| 2014/0035531 A1 | 2/2014 | Garnier et al. | |
| 2014/0070757 A1 | 3/2014 | Hong et al. | |
| 2014/0077752 A1 | 3/2014 | Barsukov et al. | |
| 2014/0084935 A1 | 3/2014 | Chatroux et al. | |
| 2014/0103939 A1 | 4/2014 | Chatroux et al. | |
| 2014/0167655 A1 | 6/2014 | Chatroux et al. | |
| 2014/0300194 A1 | 10/2014 | Carcouet et al. | |
| 2014/0312828 A1 | 10/2014 | Vo et al. | |
| 2014/0312844 A1 | 10/2014 | Mercier et al. | |
| 2014/0354232 A1 | 12/2014 | Carcouet et al. | |

FOREIGN PATENT DOCUMENTS

| | | |
|---|---|---|
| JP | 11-514732 | 12/1999 |
| JP | 2004-304931 | 10/2004 |
| JP | 2010-522528 | 7/2010 |
| KR | 2009038678 | 4/2009 |

* cited by examiner

CHARGE EQUALIZATION SYSTEM FOR BATTERIES

CROSS-REFERENCE TO RELATED APPLICATIONS

This application is the National Stage of International Application No. PCT/EP2011/051691, filed on Feb. 4, 2011, which claims the benefit of the priority date of French Application No. 10/00478, filed on Feb. 5, 2010, French Patent Application No. 10/03071, filed Jul. 21, 2010, and French Patent Application No. 10/03087, filed Jul. 22, 2010. The content of these applications is hereby incorporated by reference in its entirety.

FIELD OF DISCLOSURE

The invention relates to a charge equalization system for electrochemical accumulator batteries, that can be used notably in the field of electrical transport, hybrid transport and onboard systems. The invention relates in particular to batteries of lithium-ion (Li-ion) type adapted for applications of this kind, on account of their possibility of storing large energy with low mass. The invention is also applicable to super-capacitors.

BACKGROUND

An electrochemical accumulator has a nominal voltage of the order of a few volts, and more precisely 3.3 V for Li-ion batteries based on iron phosphate and 4.2 V for a Li-ion technology based on cobalt oxide. If this voltage is too low with respect to the requirements of the system to be powered, several accumulators are placed in series. It is also possible to dispose in parallel with each accumulator associated in series, one or more accumulators in parallel so as to increase the available capacity and to provide greater current and power. The accumulators associated in parallel thus form a stage. A stage consists of a minimum of one accumulator. The stages are arranged in series so as to attain the desired voltage level. The association of the accumulators is called an accumulator battery.

The charging or discharging of an accumulator is manifested respectively by a growth or decay of the voltage across its terminals. An accumulator is considered charged or discharged when it has attained a voltage level defined by the electrochemical process. In a circuit using several accumulator stages, the current flowing through the stages is the same. The level of charge or of discharge of the stages therefore depends on the intrinsic characteristics of the accumulators, namely the intrinsic capacitance and the series and parallel parasitic internal resistances, of the electrolyte or of contact between the electrodes and the electrolyte. Voltage differences between the stages are therefore possible on account of the disparities of manufacture and of aging.

For a Li-ion technology accumulator, too high or too low a voltage, termed the threshold voltage, may damage or destroy the accumulator. For example, overcharging a Li-ion accumulator based on cobalt oxide may cause thermal runaway thereof and start a fire. For a Li-ion accumulator based on iron phosphate, overcharging is manifested by decomposition of the electrolyte which decreases its lifetime or may impair the accumulator. Too great a discharge which leads to a voltage of less than 2 V, for example, mainly causes oxidation of the negative electrode current collector when the latter is made of copper and therefore impairment of the accumulator. Consequently, monitoring of the voltages across the terminals of each accumulator stage is compulsory during charging and discharging for the sake of safety and reliability. A so-called monitoring device in parallel with each stage makes it possible to ensure this function.

The function of the monitoring device is to follow the state of charge and of discharge of each accumulator stage and to transmit the information to the drive circuit no as to stop the charging or discharging of the battery when a stage has attained its threshold voltage. However, on a battery with several accumulator stages disposed in series, if charging is stopped when the most charged stage attains its threshold voltage, the other stages may not be fully charged. Conversely, if discharging is stopped when the most discharged stage attains its threshold voltage, the other stages may not be fully discharged. The charge of each accumulator stage is therefore not utilized in an optimal manner, this representing a major problem in applications of transport and onboard types having strong autonomy constraints. To alleviate this problem, the monitoring device is generally associated with an equalization device.

The function of the equalization device is to optimize the charge of the battery and therefore its autonomy by bringing the accumulator stages arranged in series to an identical state of charge and/or discharge. There exist two categories of equalization devices, so-called energy dissipation equalization devices, or so-called energy transfer equalization devices.

With energy dissipation equalization devices, the voltage across the terminals of the stages is rendered uniform by bypassing the charge current of one or more stages that have attained the threshold voltage and by dissipating the energy in a resistor. As a variant, the voltage across the terminals of the stages is rendered uniform by discharging one or more stages that have attained the threshold voltage. However, such energy dissipation equalization devices exhibit the major drawback of consuming more energy than required to charge the battery. Indeed, this circuit makes it necessary to discharge several accumulators or to divert the charge current of several accumulators so that the last accumulator or accumulators, which are slightly less charged, terminate their charging. The energy dissipated may therefore be much greater than the energy of the charge or charges that has or have to be terminated. Moreover, they dissipate the excess energy as heat, this not being compatible with the constraints of integration within applications of transport and onboard types, and the fact that the lifetime of the accumulators diminishes greatly when the temperature rises.

Energy transfer equalization devices exchange energy between the accumulator battery or an auxiliary energy network and the accumulator stages.

For example, U.S. Pat. No. 5,659,237 discloses a device allowing the transfer of energy from the auxiliary network to stages through a "flyback" structure with several outputs and using a coupled inductor as storage element. The latter is a specific component because it is dedicated to this application. The cost of such a component is prohibitive with respect to the function to be fulfilled.

Moreover, patent CN1905259 discloses a device allowing the transfer of energy from the stages to the battery and which, for its part, uses one inductor per accumulator as storage element. However, this device does not opt for energy transfer that is optimized for the equalization of the batteries in applications of transport and onboard types. Indeed, the end of charging of a battery is determined by the last stage which attains the threshold voltage. To terminate the charging of a battery, the energy is tapped off from one or more stage(s) and it is returned to all the stages. When one or more accumulator stage(s) is or are slightly less charged, the energy is therefore not transferred by priority to the stage(s) which needs or need it but also to the stage(s) from which the energy is tapped off. Equalization therefore requires that energy be tapped off from all the stages at the end of charging so as to avoid charging them to too high a voltage. The equalization is therefore done with high losses on account of the large number of converters in operation. Moreover, the accumulators already at the end of charging are traversed by non-useful alternating or direct components of current.

SUMMARY

The objective of the invention is therefore to propose an improved equalization device not exhibiting these drawbacks of the prior state of the art.

For this purpose, the subject of the invention is a battery equalization system comprising at least two accumulator stages arranged in series, each accumulator stage comprising at least one accumulator characterized in that said system includes:
- at least one voltage generator comprising at least one positive pole and at least one negative pole,
- for each accumulator stage an associated charging device powered by said at least one voltage generator and comprising: at least one inductor, at least one first capacitor whose first end is connected to said positive pole of said at least one voltage generator, at least one second capacitor whose first end is connected to said negative pole of said voltage generator, at least one first diode connected by its anode to the negative pole of said accumulator stage and by its cathode to the second end of said at least one first capacitor, at least one second diode connected by its anode to the negative pole of the associated accumulator stage and by its cathode to the second end of said at least one second capacitor, at least one switch connected directly or indirectly by its first end to at least one inductor and by its second end to the positive pole of the associated accumulator stage, and
- a control device configured to control said at least one voltage generator and to close said at least one switch of a charging device associated with an accumulator stage to be charged, so that said at least one inductor stores up energy and to transfer this energy to said associated accumulator stage.

Said equalization system can furthermore include one or more following characteristics, taken separately or in combination:
- said system furthermore includes: at least one third diode connected by its cathode to the first end of said inductor and by its anode to the cathode of said at least one first diode, and at least one fourth diode connected by its cathode to the first end of said inductor and by its anode to the cathode of said at least one second diode,
- said at least one third diode is connected to a first inductor and said at least one fourth diode is connected to a second inductor,
- said charging device furthermore includes: at least one fifth diode connected by its cathode to the first end of said first inductor and by its anode to the negative pole of the associated accumulator stage, and at least one sixth diode connected by its cathode to the first end of said second inductor and by its anode to the negative pole of the associated accumulator stage,
- said at least one third diode and said at least one fourth diode are connected to one and the same inductor,
- said charging device furthermore includes at least one fifth diode connected by its cathode to the first end of said inductor and by its anode to the negative pole of the associated accumulator stage,
- said charging device is configured to operate under discontinuous conduction, independently of the voltage levels of the associated accumulator stage and of the battery during the charging phase,
- the accumulators are of lithium-ion type,
- the battery includes super-capacitors.

BRIEF DESCRIPTION OF THE FIGURES

Other characteristics and advantages of the invention will be more clearly apparent on reading the following description, given by way of illustrative and nonlimiting example, and the appended drawings among which.

In these figures, substantially identical elements bear the same references.

DETAILED DESCRIPTION

Figure 1:
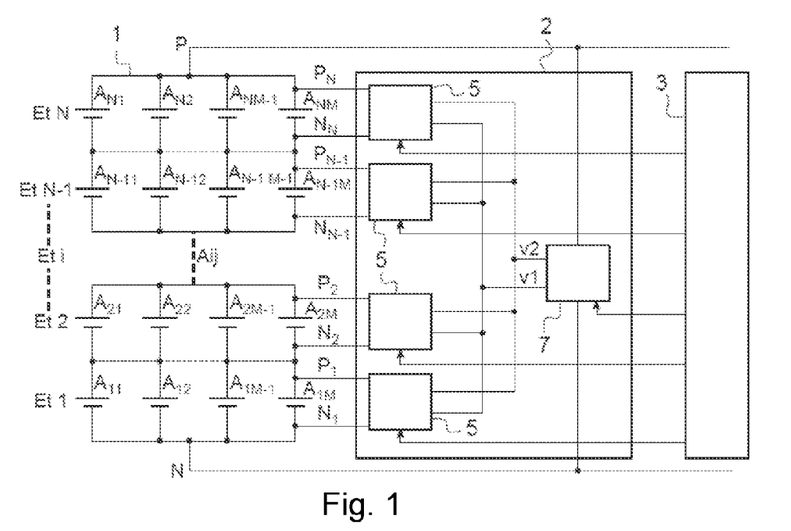
FIG. 1 represents a schematic diagram of a battery including a series arrangement of accumulator stages and of a charge equalization system for the battery including one charging device per accumulator stage and a voltage generator.

FIG. 1 represents an accumulator battery 1. This battery 1 is composed of N stages, denoted $Et_i$, connected in series. Each stage $Et_i$ is composed of an accumulator or several accumulators $A_{ij}$ connected in parallel. Here the subscript i represents the number of the stage, this subscript i varies in the example illustrated in FIG. 1 from 1 to N, and the subscript j represents the number of each accumulator in a given stage, this subscript j varies in the example illustrated from 1 to M. The terminals of the accumulators $A_{ij}$ of one and the same stage $Et_i$ are linked together by way of electrical connections, just as each stage $Et_i$ is also linked to the adjacent stages $Et_i$ by way of electrical connections.

The subject of the invention is a charge equalization system 2 for such an accumulator battery 1, including at least two stages $Et_i$ arranged in series.

Figure 2:
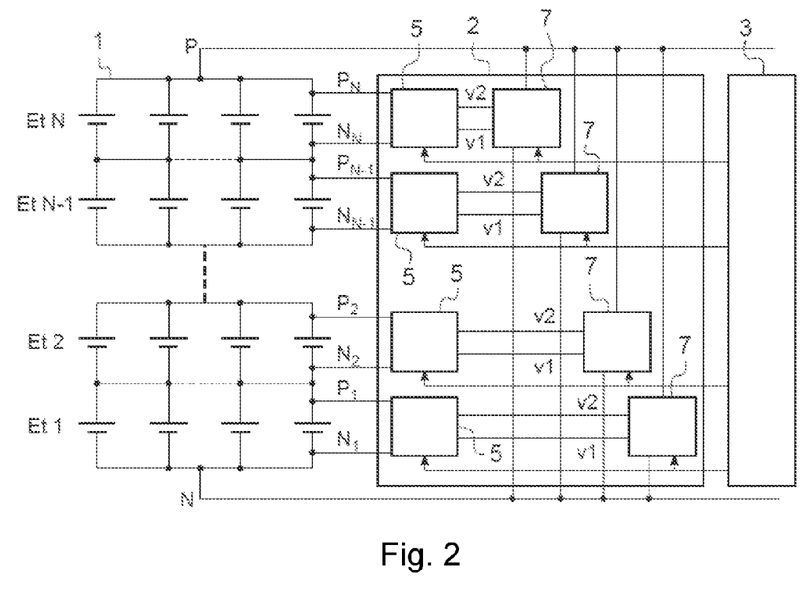
FIG. 2 represents a schematic diagram of a variant of the equalization system of FIG. 1 including a voltage generator for each charging device.
Figure 3:
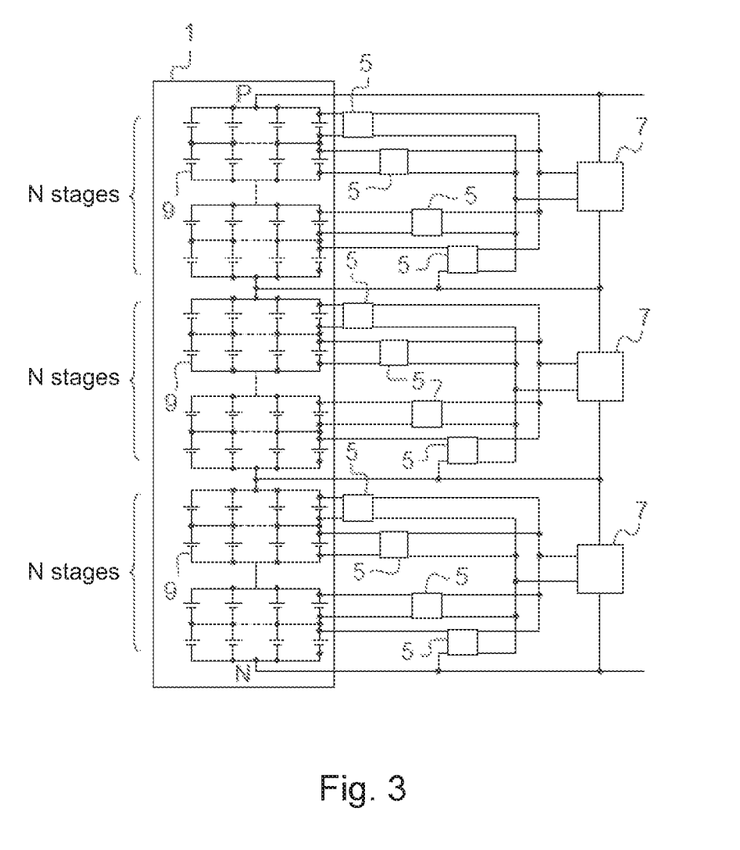
FIG. 3 represents a schematic diagram of another variant of the equalization system of FIG. 1 including a voltage generator per elementary module including a predetermined number of accumulator stages arranged in series.
Figure 4:
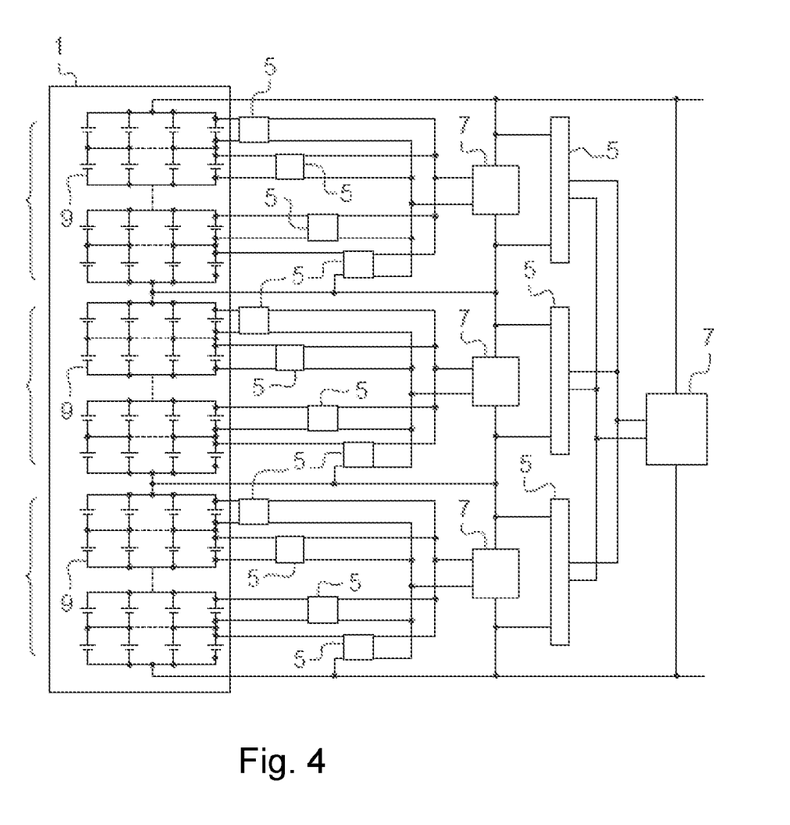
FIG. 4 represents a schematic diagram of another variant of the equalization system of FIG. 3 including an additional charging device per elementary module.

The equalization system 2 moreover includes a control device 3, a plurality of identical charging devices 5 respectively associated with an accumulator stage $Et_i$, and a voltage generator 7 (FIG. 1) or several voltage generators 7 (FIGS. 2, 3 and 4).

The charging devices 5 and the voltage generator(s) 7 are controlled by the control device 3.

The equalization system 2 can moreover include a voltage measurement device (not represented) for measuring the voltage of each stage $Et_i$ and for transferring voltage information to the control device 3 which can, on the basis of this voltage information, determine whether an accumulator stage $Et_i$ must be charged and consequently control the charging device 5 in parallel with the accumulator stage as well as the associated voltage generator 7.

The charging devices 5 are connected on the one hand to the negative pole, denoted $N_i$, and to the positive pole, denoted $P_i$, of each accumulator stage $Et_i$, and on the other hand to the positive pole, denoted v2, and to the negative pole, denoted v1, of one or more voltage generator(s) 7.

In the case of a single voltage generator 7 (FIG. 1), the latter is connected to all the charging devices 5.

In the case of multiple voltage generators 7, each voltage generator 7 is connected to a charging device 5 if the number of voltage generators 7 is equal to the number of stages $Et_i$, as illustrated by way of example in FIG. 2.

According to another alternative represented in FIG. 3, a voltage generator 7 may be connected to several charging devices 5 if the number of voltage generators 7 is less than the number of stages $Et_i$.

By way of example, when a significant number of accumulator stages $Et_i$ in series is used, as is the case for electric vehicles with for example a hundred accumulators in series, the battery 1 can consist of a series arrangement of elementary modules 9 (FIG. 3), each including for example ten to twelve accumulator stages $Et_i$ arranged in series. Thus, the connection of the voltage generator(s) 7 is made across the terminals of ten to twelve elements. The voltage withstand of the diodes and controlled switches is limited, as a function of the technology of the Li-ion battery, to about 45 V-60 V, which is a standardized voltage withstand value in the field of semi-conductors. Maintenance of a significant number of elementary modules 9, as is the case for electric vehicles, is facilitated.

Furthermore, in addition to the charging devices 5 per accumulator stages $Et_i$, it is possible to use identical charging devices 5 by arranging N stages in series, as illustrated by FIG. 4. This variant makes it possible to transfer energy between the N adjacent stages, and therefore between the elementary modules 9 associated in series. In this case, one or more additional voltage generator(s) 7, is or are used to provide the energy to the charging devices 5 connected to the terminals of N stages.

The voltage generator(s) 7 provides or provide the charging devices 5 with voltage pulses of positive, negative or positive and negative polarity (polarities) and of possibly varied shape, for example square waveform or sinusoidal.

Various embodiments of the equalization system 2 are now described.

First Embodiment

Charging Device

Figure 5A:
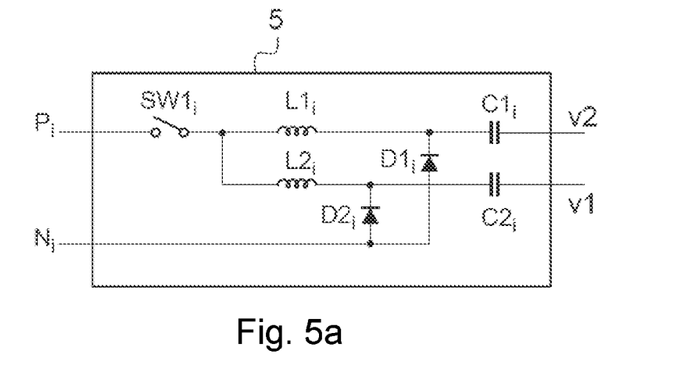
FIG. 5a illustrates a schematic diagram of a first embodiment of a charging device for the equalization system.

Referring to FIG. 5a, according to a first embodiment a charging device 5 includes:

- a first inductor $L1_i$,
- a second inductor $L2_i$,
- a first capacitor $C1_i$ whose first end is connected to the pole v2 of a voltage generator 7 and whose second end is connected to the first end of the first inductor $L1_i$,
- a second capacitor $C2_i$ whose first end is connected to the pole v1 of the voltage generator 7 and whose second end is connected to the first end of the second inductor $L2_i$,
- a first diode $D1_i$ whose anode and cathode are connected respectively to the pole $N_i$ of the stage and to the second end of the capacitor $C1_i$,
- a second diode $D2_i$ whose anode and cathode are connected respectively to the pole $N_i$ of the stage and to the first end of the second inductor $L2_i$,
- a switch $SW1_i$, for example a MOSFET transistor, whose first end is connected to the second ends of the two inductors $L1_i$ and $L2_i$ and whose second end to the pole $P_i$ of the accumulator stage.

This charging device 5 is adapted to be used with a voltage generator 7 providing a square waveform of positive and also negative voltages.

Figure 5B:
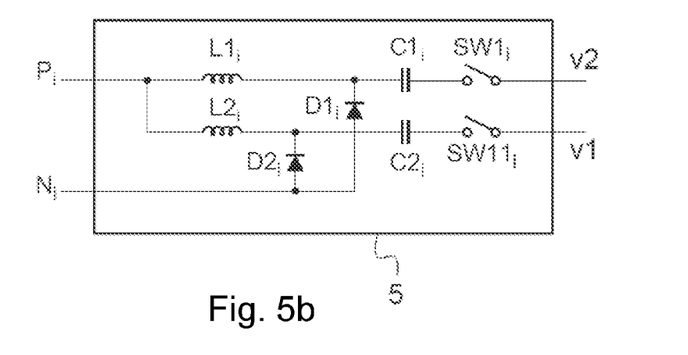
FIG. 5b illustrates a schematic diagram of a first variant embodiment of the charging device of FIG. 5a, FIG. 5c illustrates a schematic diagram of a second variant embodiment of the charging device of FIG. 5a, FIG. 6 illustrates a schematic diagram of an exemplary embodiment of a voltage generator associated with a charging device of FIGS. 5a to 5c, 11, 12, 13.
Figure 5C:
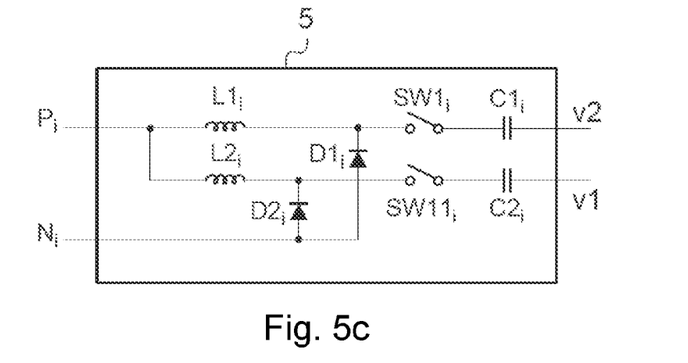
Figure 6:
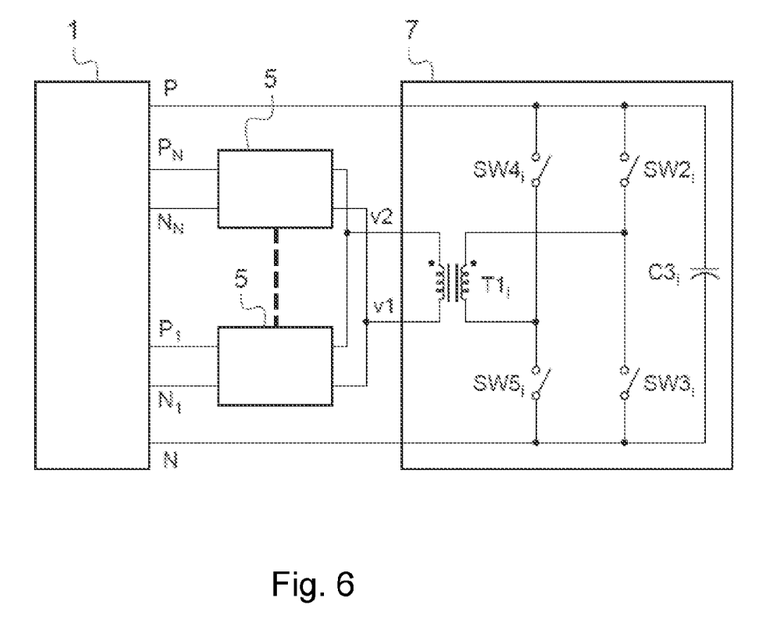

Variant positions of the switch $SW1_i$ for this embodiment of the charging device 5 are illustrated in FIGS. 5b and 5c.

In FIG. 5b, the switch $SW1_i$ is connected by its first end to the positive pole v2 of the voltage generator 7 and by its second end to the first end of the first capacitor $C1_i$. The two inductors $L1_i$ and $L2_i$ are then connected to the pole $P_i$ of the accumulator stage.

In FIG. 5c, the first end of the switch $SW1_i$ is connected to the second end of the first capacitor $C1_i$ and its second end is connected to the cathode of the first diode $D1_i$.

Moreover as noted in these FIGS. 5b and 5c, an additional switch $SW11_i$ must moreover be connected either to the output v1 of the voltage generator 7 and to the first end of the second capacitor $C2_i$ (FIG. 5b), or to the second end of the second capacitor $C2_i$ and to the cathode of the second diode $D2_i$ (FIG. 5c).

These two other possible positionings of the switch $SW1_i$ such as are represented in FIGS. 5b and 5c, make it possible to avoid energy being exchanged between the components of the voltage generator 7 and of the charging device 5 when the switch $SW1_i$ of the charging device 5 is in the open state and the voltage generator 7 is controlled.

The control device 3 makes it possible to close and to open the switch $SW1_i$ and/or the switch $SW11_i$ when it exists.

Such a charging device 5 operates equally well in the continuous and discontinuous conduction regime.

Operation in the discontinuous conduction regime is to be favored since it exhibits the advantage of being easier to implement and of costing less.

Indeed, in discontinuous conduction mode, the current through the inductor $L1_i$ is cancelled by definition before each operating period T of the charging device 5. The value of the current passing through the inductor $L1_i$ when the voltage generator 7 provides energy may be deduced from the voltage applied across the terminals of the inductor $L1_i$, from the time of energy storage in the inductor $L1_i$ and from the value of the latter. Subsequent to this, the voltage generator 7 may be controlled by control with fixed conduction time.

Another variant embodiment consists in using for each charging device 5 a controlled switch in place of each diode. Rectification of so-called synchronous type is then possible. The efficiency of the charging device 5 may be increased by virtue of the decrease in the voltage drop in the on state of the component.

Voltage Generator

Various embodiments of a voltage generator 7 generating as output a square waveform with positive and negative voltages have been represented in FIGS. 6 to 9.

The voltage generator 7 may be connected to the terminals of an elementary module 9 but also to the terminals of the battery 1, or indeed to the terminals of an auxiliary source (12 V vehicle for example).

Figure 7:
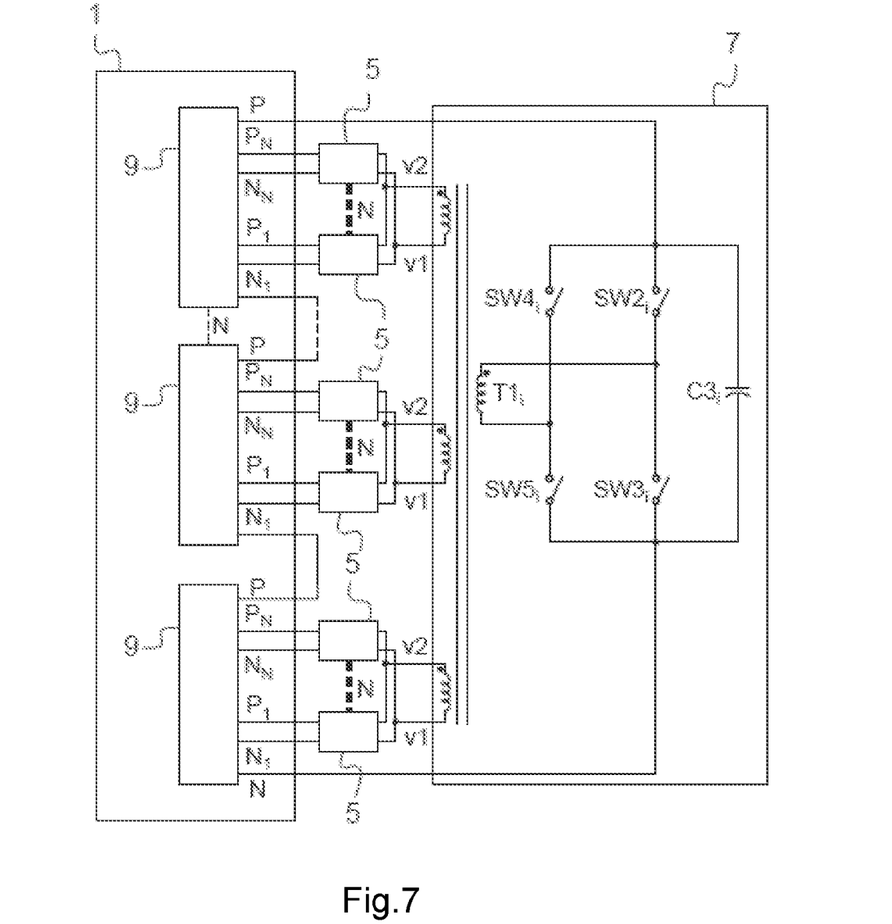
FIG. 7 illustrates a schematic diagram of a variant embodiment of the voltage generator of FIG. 6.

A first exemplary embodiment of the voltage generator consists in using a complete bridge with four switches $SW2_i$ to $SW5_i$ and a transformer $T1_i$ (FIG. 6) or according to a variant of the transformer $T1_i$, illustrated by FIG. 7. According to this variant, the transformer $T1_i$ consists of a primary winding and of several secondary windings.

The use of several secondary windings makes it possible to decrease the voltage withstand of the capacitors of the charging devices 5.

Figure 8:
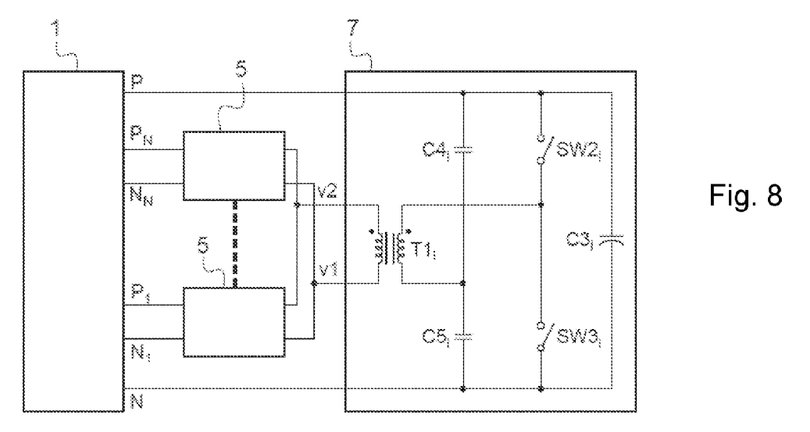
FIG. 8 is a schematic diagram of a second variant embodiment of the voltage generator of FIG. 6.

A second exemplary embodiment of the voltage generator 7 illustrated in FIG. 8 consists in using a half-bridge with two switches $SW2_i$ and $SW3_i$, and a transformer $T1_i$ whose primary is connected between the midpoints of the two switches $SW2_i$ and $SW3_i$ and of two capacitors $C4_i$ and $C5_i$.

The second exemplary embodiment exhibits the advantage of having a reduced number of switches with respect to the first example, and also of avoiding any risk of saturation of the transformer due to an imbalance of the control sequence for the switches by virtue of the capacitors $C4_i$ and $C5_i$ in series with the primary winding of the transformer $T1_i$.

Figure 9:
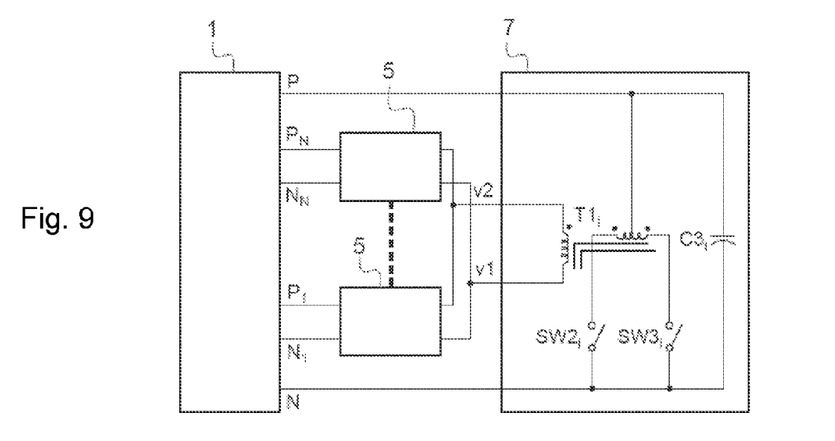
FIG. 9 is a schematic diagram of a third variant embodiment of the voltage generator of FIG. 6.

A third exemplary embodiment of the voltage generator consists in using a transformer $T1_i$ with midpoint at the primary and two switches $SW2_i$ and $SW3_i$ (FIG. 9). The third exemplary embodiment exhibits the advantage of a common reference for the control of the two switches $SW2_i$ and $SW3_i$.

Whichever voltage generator 7 is used, the conduction time of the switches $SW2_i$ and $SW3_i$ is defined so that each charging device 5 operates in the discontinuous conduction regime.

Operation

The operation of the equalization system 2 including a charging device 5 according to a first embodiment such as illustrated in FIG. 5a and a voltage generator 7 according to FIG. 8 is described hereinafter.

The charging devices 5 make it possible to track the charging of certain stages under charge. The operation of the setup in the discontinuous conduction regime is preferred for the reasons described previously.

For example, when the control device 3 controls the transfer of energy to a stage $Et_i$, for example to the stage $Et_1$, the switch $SW1_1$ of the charging device 5 in parallel of the corresponding stage $Et_1$ is closed by the control device 3. This process is depicted by flow chart 100, FIG. 14, and described below.

The voltage generator 7, powering the charging device 5, is also activated by the control device 3.

The stages in series with the stage $Et_1$ are not charged as long as the switch $SW1_i$ of the charging devices 5 in parallel of each stage remains in the open state.

When a charging device 5 is set into operation and the voltage generator 7 was operating beforehand, the switch $SW1_i$ closing speed must be controlled so as to avoid providing the stage with too great a current.

The switches are considered to be perfect when they are in the blocked state and therefore do not allow any current to pass when they are in this state.

Figure 10:
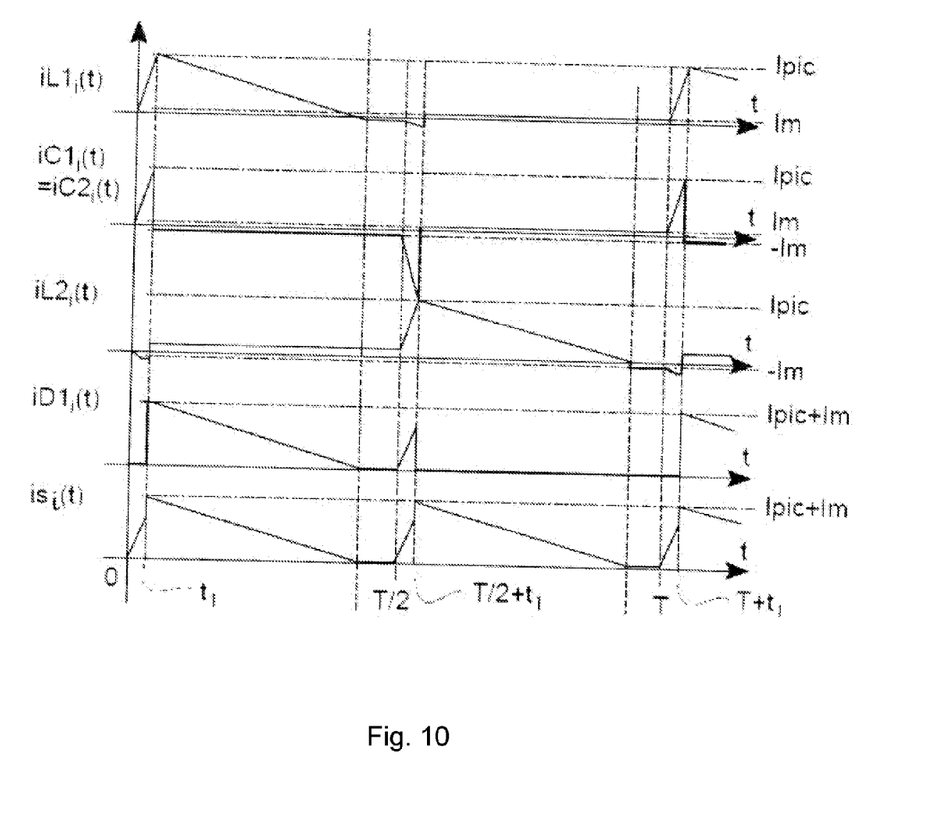
FIG. 10 is a chart representing in a schematic manner the evolution of the various currents as a function of time in the charging device of FIGS. 5a, 5b, 5c.
Figure 14:
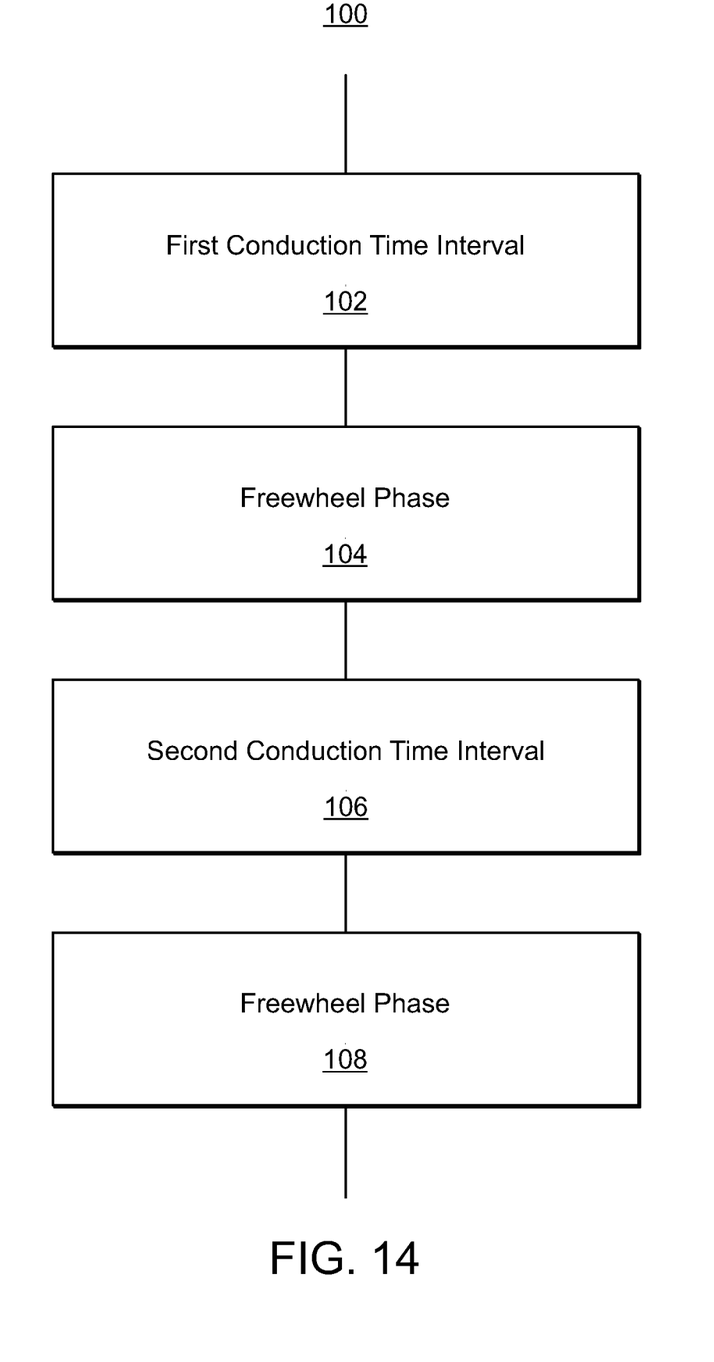
FIG. 14 illustrates a flow chart depicting the control algorithm of the charging device for the equalization system.

With reference to FIGS. 5a, 8 and 10, during a conduction time t1, during first conduction time interval, step 102, FIG. 14, a positive voltage is applied between the terminals v2 and v1 of the voltage generator 7.

The switch $SW2_1$ is closed and the switch $SW3_1$ is open. The voltage generator 7 therefore provides a square waveform of positive voltage as long as the switch $SW2_1$ is closed and the switch $SW3_1$ is open.

During the time t1, energy is stored up in the inductor $L1_1$. The current through the inductor $L1_1$ increases in proportion to the voltage applied to its terminals, equal approximately to the voltage of the secondary of the transformer $T1_1$ minus the voltage of the stage $Et_1$ under charge.

The current passes only through the stage $Et_1$.

The current through the capacitors $C1_1$ and $C2_1$ of the charging device 5 in operation is equal to the current through the inductor $L1_1$. The capacitors $C1_1$ and $C2_1$ are of sufficiently great value so as to transmit the current necessary to impose a quasi-constant voltage across the terminals of the inductors $L1_1$ and $L2_1$.

During this time t1, the second diode $D2_1$ of the charging device 5 conducts and the first diode $D1_1$ is blocked.

After the time t1, during freewheel phase, step 104, FIG. 14, the switch $SW2_1$ of the voltage generator 7 opens.

The current in the inductor $L1_1$ attains at this instant a peak value Ipic, equal approximately to the voltage applied to the terminals of the inductor $L1_1$ when the voltage generator provides energy, multiplied by t1 and divided by the value of the inductor $L1_1$. This formula is approximate insofar as it considers that the current in the inductor is zero before each operating period of the charging device 5.

After the time t1 and until half the operating period T/2, the voltage generator 7 imposes a zero voltage (FIGS. 6 and 9) or does not impose any voltage (FIG. 8) on the terminals v2 and v1 of the charging device 5 of the stage $Et_1$. The switches $SW3_1$ and $SW2_1$ are open. The current through the inductor $L1_1$ decreases in proportion to the voltage applied to its terminals.

During this phase, the second diode $D2_1$ is blocked.

The first diode $D1_1$ is on until the sum of the currents through the inductors $L1$ and $L2_1$ cancels out. The first diode $D1_1$ therefore conducts the current through the inductor $L1_1$ and also the current through the inductor $L2_1$. The current through the inductor $L2_1$ is considered constant during this phase insofar as the impedance of the secondary of the transformer is considered markedly greater than the impedance of the inductors $L1_1$ and $L2_1$. The current through the inductor $L2_1$ is equal to the transformer magnetization current. It is denoted Im in FIG. 10.

When the first diode $D1_1$ is blocked, the current through the inductor $L2_1$ no longer passes through the stage but is equal to the opposite of the current through the inductor $L1_1$.

After the half period T/2 and until the end of the time T/2 plus the time t1, a negative voltage is applied between the terminals v2 and v1 of the voltage generator (second conduction time interval, step 106, FIG. 14). The switch $SW3_1$ is closed and the switch $SW2_1$ is open. Energy is stored up in the inductor $L2_1$. The current through the inductor $L2_1$ increases in proportion to the voltage applied to its terminals. The current passes only through the stage $Et_1$ under charge. The current through the capacitors $C1_1$ and $C2_1$ of the charging device in operation is equal to the current through the inductor $L2_1$.

During this phase, the first diode $D1_1$ conducts. The second diode $D2_1$ is blocked.

After the time T/2 plus t1, the switch $SW3_1$ opens. The current in the inductor $L2_1$ attains at this instant a peak value Ipic, equal approximately to the voltage applied to the terminals of the inductor $L2_1$ when the voltage generator 7 provides energy, multiplied by t1 and divided by the value of the inductor. As previously, this formula is approximate insofar as it considers that the current in the inductor is zero before each operating period of the charging device 5.

After the time T/2 plus t1 until the end of the period T, during freewheel phase, step 108, FIG. 14, the voltage generator 7 does not impose any voltage across the terminals v2 and v1 of the charging device 5 of the stage $Et_1$. The switches $SW3_1$ and $SW2_1$ are open. The current through the inductor $L2_1$ decreases in proportion to the voltage applied to its terminals.

During this phase, the first diode $D1_1$ is blocked.

The second diode $D2_1$ is on until the sum of the currents through the inductors $L1_1$ and $L2_1$ under charge cancels out. The second diode $D2_1$ conducts the current through the inductor $L2_1$ and also the current through the inductor $L1_1$. The current through the inductor $L1_1$ is equal to the transformer magnetization current (Im).

When the second diode $D2_1$ is blocked, the current through the inductor $L1_1$ no longer passes through the stage but is equal to the opposite of the current through the inductor $L2_1$.

At the end of the period T, a new operating sequence begins if the switch $SW1_1$ is still in the closed state. The voltage generator 7 is controlled in such a way that the two switches $SW2_1$ and $SW3_1$ are not on at the same time so as to avoid a short-circuit of the battery.

Second Embodiment

Figure 11:
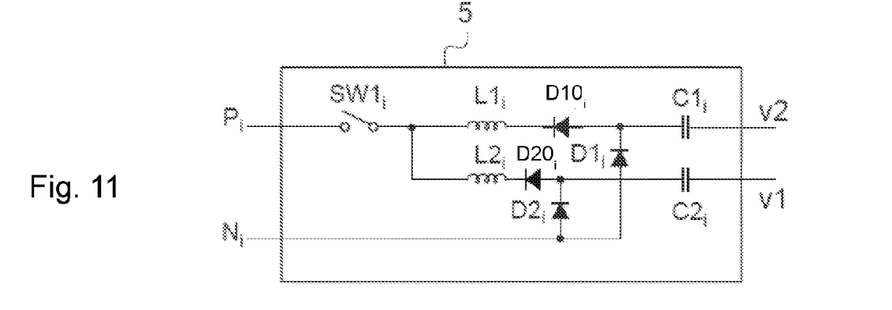
FIG. 11 illustrates a schematic diagram of a second embodiment of a charging device for the equalization system.

According to a second embodiment illustrated in FIG. 11, the charging device 5 furthermore includes:
a third diode $D10_i$ mounted in series with the first inductor $L1_i$, connected by its cathode to the first end of the first inductor $L1_i$ and by its anode to the cathode of the first diode $D1_i$, and
a fourth diode $D20_i$ mounted in series with the second inductor $L2_i$, connected by its cathode to the first end of the second inductor $L2_i$ and by its anode to the cathode of the second diode $D2_i$.

The operation of the equalization system 2 with a charging device 5 according to the second embodiment is substantially identical to the operation of the first embodiment.

However, when the first inductor $L1_i$ stores up energy for the duration t1, the second diode $D2_i$ being on and the first diode $D1_i$ blocked, the fourth diode $D20_i$ mounted in series with the second inductor $L2_i$ is also blocked so as to prevent current from passing through the second inductor $L2_i$.

Likewise, when it is the second inductor $L2_i$ which stores up energy, the first diode $D1_i$ being on and the second diode $D2_i$ blocked, the third diode $D10_i$ mounted in series with the first inductor $L1_i$ is also blocked so as to prevent current from passing through the first inductor $L1_i$.

The occurrence of an overvoltage across the terminals of the inductor $L1_i$ or $L2_i$ is thus avoided when respectively the switch $SW3_1$ or $SW2_1$ opens.

Third Embodiment

Figure 12:
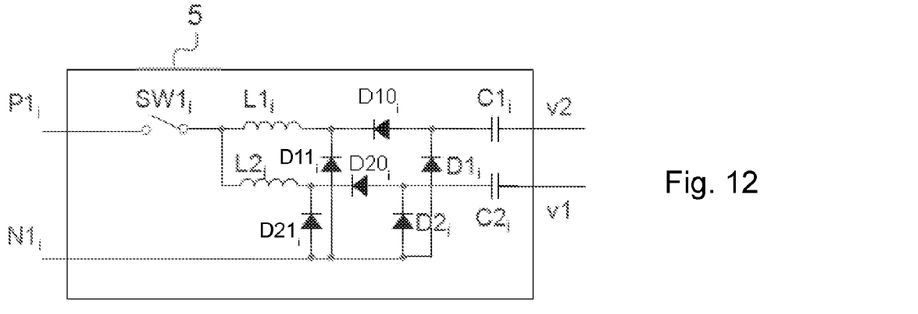
FIG. 12 illustrates a schematic diagram of a third embodiment of a charging device for the equalization system.

According to a third embodiment illustrated in FIG. 12, the charging device 5 moreover includes, with respect to the second embodiment:
a fifth diode $D11_i$ connected by its cathode to the first end of the first inductor $L1_i$ and to the cathode of the third diode $D10_i$, and by its anode to the negative pole $N_i$ of the associated accumulator stage, and
a sixth diode $D21_i$ connected by its cathode to the first end of the second inductor $L2_i$ and to the cathode of the fourth diode $D20_i$, and by its anode to the negative pole $N_i$ of the associated accumulator stage.

The operation of the equalization system 2 with a charging device 5 according to the third embodiment is identical to the operation of the second embodiment. However, the fifth $D11_i$ and sixth $D21_i$ diodes make it possible to obtain an efficiency of energy transfer which is increased with respect to the second embodiment because it now depends on only a single threshold of a diode $D11_i$ or $D21_i$ instead of two thresholds of diodes $D1_i$ and $D10_i$ or $D2_i$ and $D20_i$ as in the second embodiment when the current through the inductors $L1_i$, $L2_i$ decreases. This minimizes the losses due to the diodes during the freewheel phase from the instant t1 to the instant at which the current cancels out through the inductor, therefore during the phase which lasts the longest.

Fourth Embodiment

Figure 13:
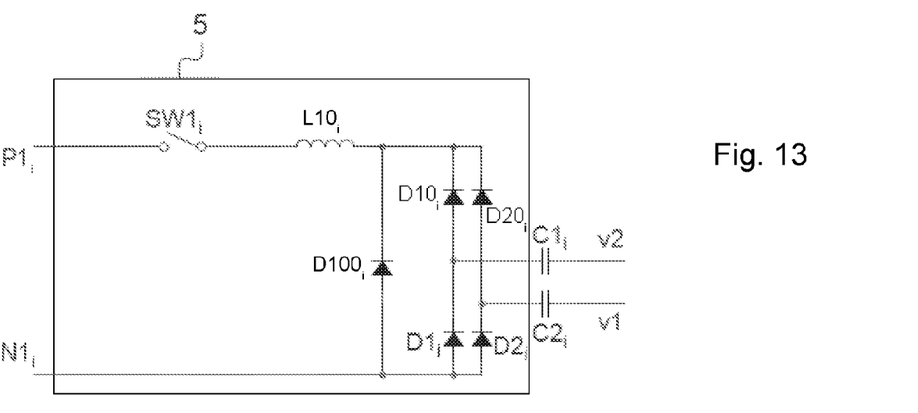
FIG. 13 illustrates a schematic diagram of a fourth embodiment of a charging device for the equalization system.

Finally, according to a fourth embodiment illustrated in FIG. 13, the charging device 5 differs from the third embodiment, by the fact that there is now only a single inductor $L10_i$ and no longer a first inductor $L1_i$ and a second inductor $L2_i$, as described previously.

More precisely, this inductor $L10_i$ corresponds to the two inductors $L1_i$ and $L2_i$ of the previous embodiments whose first ends are connected together. The inductors $L10_i$ and $L2_i$ henceforth connected in parallel are replaced with a single inductor $L10_i$.

The operation of the equalization system 2 with a charging device 5 according to the fourth embodiment is identical to the operation according to the third embodiment except for the difference that, whatever the polarity of the output voltage of the voltage generator 7, a single inductor $L10_i$ stores up energy during the time t1, the continuity of the current through the inductor $L10_i$ is ensured by a single diode $D100_i$ when the voltage generator 7 imposes a zero voltage or does not impose any voltage on the input of the transformer $T1_i$. This diode $D100_i$ corresponds by analogy with the third embodiment to the fifth $D11_i$ and sixth $D21_i$ diodes connected in parallel.

This makes it possible to reduce the number of components while ensuring efficiency of energy transfer similar to the third embodiment.

The invention claimed is:
1. An apparatus comprising a battery equalization system for a battery, said battery comprising at least two accumulator stages arranged in series, each of said at least two accumulator stages having a negative pole, a positive pole, and at least one accumulator placed between said negative pole and said positive pole; said battery equalization system comprising:
   a voltage generator comprising a positive terminal and a negative terminal and configured to apply a voltage between said positive terminal and said negative terminal;
   for each accumulator stage, a charging device, wherein each accumulator stage is associated with its own charging device, powered by said voltage generator, said charging device comprising at least one inductor, a first capacitor, a second capacitor, a first diode, a second diode, and a switch, wherein said first capacitor has a first end connected to a terminal of said voltage generator and a second end linked to said at least one inductor, wherein said second capacitor has a first end connected to a terminal of said voltage generator and a second end linked to said at least one inductor, wherein said first diode has an anode connected to said negative pole of the accumulator stage and a cathode connected to said second end of said first capacitor, wherein said second diode has an anode connected to said negative pole of the accumulator stage and a cathode connected to said second end of said second capacitor, wherein at least one diode in said charging device has an anode connected to said negative pole of the accumulator stage and has a cathode connected to one end of said at least one inductor, so as to allow, when said at least one diode is on, a charging current to flow through the accumulator stage, said at least one diode and said at least one inductor, and wherein said switch is linked to said at least one inductor and linked to a pole of the accumulator stage, such that said switch is connected in series with one of said at least one inductor and one of said first and second capacitors of said charging device between a terminal of said voltage generator and a pole of the accumulator stage; and
   a control device, wherein said control device is configured to control each one of the at least two accumulator stages to be charged with the following steps in order:
      during a first conduction time interval to close the switch of the charging device associated with the accumulator stage to be charged and to apply a positive voltage between said terminals of said voltage generator such that a current passes from said positive terminal through said first capacitor, said at least one inductor, the accumulator stage associated to said charging device, and said second capacitor to said negative terminal; said switch being passed through by an increasing power supply current originating from said voltage generator and that said at least one inductor stores energy;
      during a freewheel phase, upon completion of said first conduction time interval, by opening the switch of the charging device associated with the accumulator stage to be charged, interrupting said power supply current through said at least one inductor and allow transfer of said energy stored in said at least one inductor to the accumulator stage to be charged by circulation of a decreasing charging current through said at least one diode in said charging device and said at least one inductor, a zero voltage or no voltage being imposed on said positive terminal and said negative terminal by the voltage generator; and
      during a second conduction time interval, to close the switch of the charging device associated with the accumulator stage to be charged and to apply a negative voltage between said terminals of said voltage generator such that a current passes in opposite direction with respect to the first conduction time interval from said negative terminal through said second capacitor, the accumulator stage to be charged, said at least one inductor, and said first capacitor to said positive terminal; said switch being passed through by an increasing power supply current originating from said voltage generator and that said at least one inductor stores energy.

2. The apparatus of claim 1, wherein said first capacitor has a first end connected to said positive terminal of said voltage generator, and wherein said second capacitor has a first end connected to said negative terminal of said voltage generator.

3. The apparatus of claim 1, wherein said switch comprises a first end and a second end, and wherein said switch is connected by said first end to said at least one inductor and by said second end to said positive pole of said associated accumulator stage.

4. The apparatus of claim 1, wherein the charging device of each of said at least two accumulator stages comprises a first inductor, a second inductor, a first switch and a second switch, wherein said first inductor has a first end connected to a second end of said first capacitor and to said cathode of said first diode, wherein said second inductor has a first end connected to a second end of said second capacitor and to said cathode of said second diode, and wherein said first switch is connected to said first inductor and said second switch is connected to said second inductor.

5. The apparatus of claim 1, wherein the charging device of each of said at least two accumulator stages is configured to operate under discontinuous conduction, independently of voltage levels of said associated accumulator stage and of said battery during a charging phase thereof.

6. The apparatus of claim 1, wherein the at least one accumulator of each of said at least two accumulator stages are of a lithium-ion type.

7. The apparatus of claim 1, wherein said battery comprises super-capacitors.

8. The apparatus of claim 1, wherein the charging device of each of said at least two accumulator stages comprises a first inductor, a second inductor, and switch, wherein said first inductor has a first end connected to a second end of said first capacitor and to said cathode of said first diode, wherein said second inductor has a first end connected to a second end of said second capacitor and to said cathode of said second diode, and wherein said switch is connected to said first and second inductors.

9. The apparatus of claim 8, wherein said first diode is connected by said anode thereof to said negative pole of said associated accumulator stage and by said cathode thereof to said second end of said first capacitor and to one end of said first inductor thereby allowing, when said first diode is on, a circulation of a charging current through said associated accumulator stage, said first diode, and said first inductor.

10. The apparatus of claim 8, wherein said second diode is connected by said anode thereof to said negative pole of said-associated accumulator stage and by said cathode thereof to said second end of said second capacitor and to one end of said second inductor so as to allow, when said second diode is on, a circulation of a charging current through said associated accumulator stage, said second diode, and said second inductor.

11. The apparatus of claim 1, further comprising a third diode, said third diode being connected by a cathode thereof to said first end of said at least one inductor and by an anode thereof to said cathode of said first diode, and a fourth diode connected by a cathode thereof to said first end of said at least one inductor and by an anode thereof to said cathode of said second diode.

12. The apparatus of claim 11, wherein
said charging device comprises a first inductor, a second inductor, wherein
said first inductor has a first end connected to a second end of said first capacitor and to said cathode of said first diode, wherein
said second inductor has a first end connected to a second end of said second capacitor and to said cathode of said second diode, wherein
said third diode is connected to said first inductor, and wherein
said fourth diode is connected to said second inductor.

13. The apparatus of claim 12, wherein the charging device of each of said at least two accumulator stages further comprises a fifth diode connected by a cathode thereof to said first end of said first inductor and by an anode thereof to said negative pole of said associated accumulator stage, and a sixth diode connected by a cathode thereof to said first end of said second inductor and by an anode thereof to said negative pole of said associated accumulator stage.

14. The apparatus of claim 11, wherein said third diode and said fourth diode are connected to said at least one inductor.

15. The apparatus of claim 14, wherein the charging device of each of said at least two accumulator stages further comprises a fifth diode connected by a cathode thereof to said first end of said at least one inductor and by an anode thereof to said negative pole of said associated accumulator stage.

16. An apparatus comprising a battery equalization system for a battery, said battery comprising at least two accumulator stages arranged in series, each of said at least two accumulator stages having a negative pole, a positive pole, and at least one accumulator placed between said negative pole and said positive pole; said battery equalization system comprising:
a voltage generator comprising a positive terminal and a negative terminal and configured to apply a voltage between said positive terminal and said negative terminal;
for each accumulator stage, a charging device, wherein each accumulator stage is associated with its own charging device, powered by said voltage generator, said charging device comprising a first inductor and a second inductor, a first capacitor, a second capacitor, a first diode, a second diode, a third diode, a fourth diode, a fifth diode, a sixth diode and a switch, wherein said first capacitor has a first end connected to a terminal of said voltage generator and a second end linked to said first inductor, wherein said second capacitor has a first end connected to a terminal of said voltage generator and a second end linked to said second inductor, wherein said first diode has an anode connected to said negative pole of the accumulator stage and a cathode connected to said second end of said first capacitor, wherein said second diode has an anode connected to said negative pole of the accumulator stage and a cathode connected to said second end of said second capacitor, wherein said third diode is mounted in series between said first capacitor and said first inductor and has an anode connected to the second end of said first capacitor and the cathode of the first diode and a cathode connected to a first end of said first inductor, wherein said fourth diode is mounted in series between said second capacitor and said second inductor and has an anode connected to the second end of said second capacitor and the cathode of the second diode and a cathode connected to a first end of said second inductor, said fifth diode being connected by a cathode thereof to said first end of said first inductor and to the cathode of said third diode and by an anode thereof to said negative pole of the accumulator stage, and a sixth diode connected by a cathode thereof to said first end of said second inductor and to the cathode of said fourth diode and by an anode thereof to said negative pole of the accumulator stage, wherein a first end of said switch charging device is linked to a second end of said first inductor and a second end of said second inductor and a second end of said switch is linked to a pole of said associated accumulator stage; and
a control device, wherein said control device is configured to control each one of the at least two accumulator stages to be charged with the following steps in order:
during a first conduction time interval to close the switch of the charging device associated with the accumulator stage to be charged and to apply a positive voltage between said terminals of said voltage generator such that a current passes from said positive terminal through said first capacitor, said third diode, said first inductor, the accumulator stage to be charged, said second diode and said second capacitor to said negative terminal; said switch being passed through by an increasing power supply current originating from said voltage generator and that said first inductor stores energy;
during a freewheel phase, upon completion of said first conduction time interval, by opening the switch of the charging device of the accumulator to be charged, interrupting said power supply current through said first inductor and allow transfer of said energy stored in said first inductor to the accumulator stage to be charged by circulation of a decreasing charging current through said fifth diode in said charging device and said first inductor, a zero voltage or no voltage being imposed on said positive terminal and said negative terminal by the voltage generator,
during a second conduction time interval, to close the switch of the charging device associated with the accumulator stage to be charged and to apply a negative voltage between said terminals of said voltage generator such that a current passes in opposite direction with respect to the first conduction time interval from said negative terminal through said second capacitor, said fourth diode, said second inductor, the accumulator stage to be charged, said first diode and said first capacitor to said positive terminal; said switch being passed through by an increasing power supply current originating from said voltage generator and that said second inductor stores energy,
during a freewheel phase, upon completion of said second conduction time interval, by opening the switch of the charging device of the accumulator stage to be charged, interrupting said power supply current through said second inductor and allow transfer of said energy stored in said second inductor to the accumulator stage to be charged by circulation of a decreasing charging current through said sixth diode in the charging device of the accumulator stage to be charged and said second inductor, a zero voltage or no voltage being imposed on said positive terminal and said negative terminal by the voltage generator.

17. An apparatus comprising a battery equalization system for a battery, said battery comprising at least two accumulator stages arranged in series, each of said at least two accumulator stages having a negative pole, a positive pole, and at least one accumulator placed between said negative pole and said positive pole; said battery equalization system comprising:

a voltage generator comprising a positive terminal and a negative terminal and configured to apply a voltage between said positive terminal and said negative terminal;

for each accumulator stage, a charging device, wherein each accumulator stage is associated with its own charging device, powered by said voltage generator, said charging device comprising a single inductor, a first capacitor, a second capacitor, a first diode, a second diode, a third diode, a fourth diode, a fifth diode, and a switch, wherein said first capacitor has a first end connected to a terminal of said voltage generator and a second end linked to said single inductor, wherein said second capacitor has a first end connected to a terminal of said voltage generator and a second end linked to said single inductor, wherein said first diode has an anode connected to said negative pole of the accumulator stage and a cathode connected to said second end of said first capacitor, wherein said second diode has an anode connected to said negative pole of the accumulator stage and a cathode connected to said second end of said second capacitor, wherein said third diode is mounted in series between said first capacitor and said single inductor and has an anode connected to the second end of said first capacitor and the cathode of the first diode and a cathode connected to said first end of said single inductor, wherein said fourth diode is mounted in series between said second capacitor and said single inductor and has an anode connected to the second end of said second capacitor and the cathode of the second diode and a cathode connected to a first end of said single inductor, said fifth diode being connected by a cathode thereof to said first end of said single inductor and by an anode thereof to said negative pole of the accumulator stage, wherein a first end of said switch is linked to a second end of said single inductor and a second end of said switch is linked to a pole of said associated accumulator stage; and a control device, wherein said control device is configured to control each one of the at least two accumulator stages to be charged with the following steps in order:

during a first conduction time interval to close the switch of a charging device associated with an accumulator stage to be charged and to apply a positive voltage between said terminals of said voltage generator such that a current passes from said positive terminal through said first capacitor, said third diode, said single inductor, accumulator stage to be charged, said second diode and said second capacitor to said negative terminal, said switch being passed through by an increasing power supply current originating from said voltage generator and that said single inductor stores energy, during a freewheel phase, upon completion of said first conduction time interval, by opening the switch of the charging device of the accumulator to be charged, interrupting said power supply current through said single inductor and allow transfer of said energy stored in said single inductor to the accumulator stage to be charged by circulation of a decreasing charging current through said fifth diode in the charging device of the accumulator stage to be charged and said single inductor, a zero voltage or no voltage being imposed on said positive terminal and said negative terminal by the voltage generator, during a second conduction time interval, to close the switch of the charging device associated with the accumulator stage to be charged and to apply a negative voltage between said terminals of said voltage generator such that a current passes in opposite direction with respect to the first conduction time interval from said negative terminal through said second capacitor, said fourth diode, the accumulator stage to be charged, said single inductor, said first diode and said first capacitor to said positive terminal; said switch being passed through by an increasing power supply current originating from said voltage generator and that said single inductor stores energy; and during a freewheel phase, upon completion of said second conduction time interval, by opening the switch of the charging device of the accumulator stage to be charged, interrupting said power supply current through said single inductor and allow transfer of said energy stored in said single inductor to the accumulator stage to be charged by circulation of a decreasing charging current through said fifth diode in said charging device and said single inductor, a zero voltage or no voltage being imposed on said positive terminal and said negative terminal by the voltage generator.

* * * * *